UNITED STATES PATENT OFFICE.

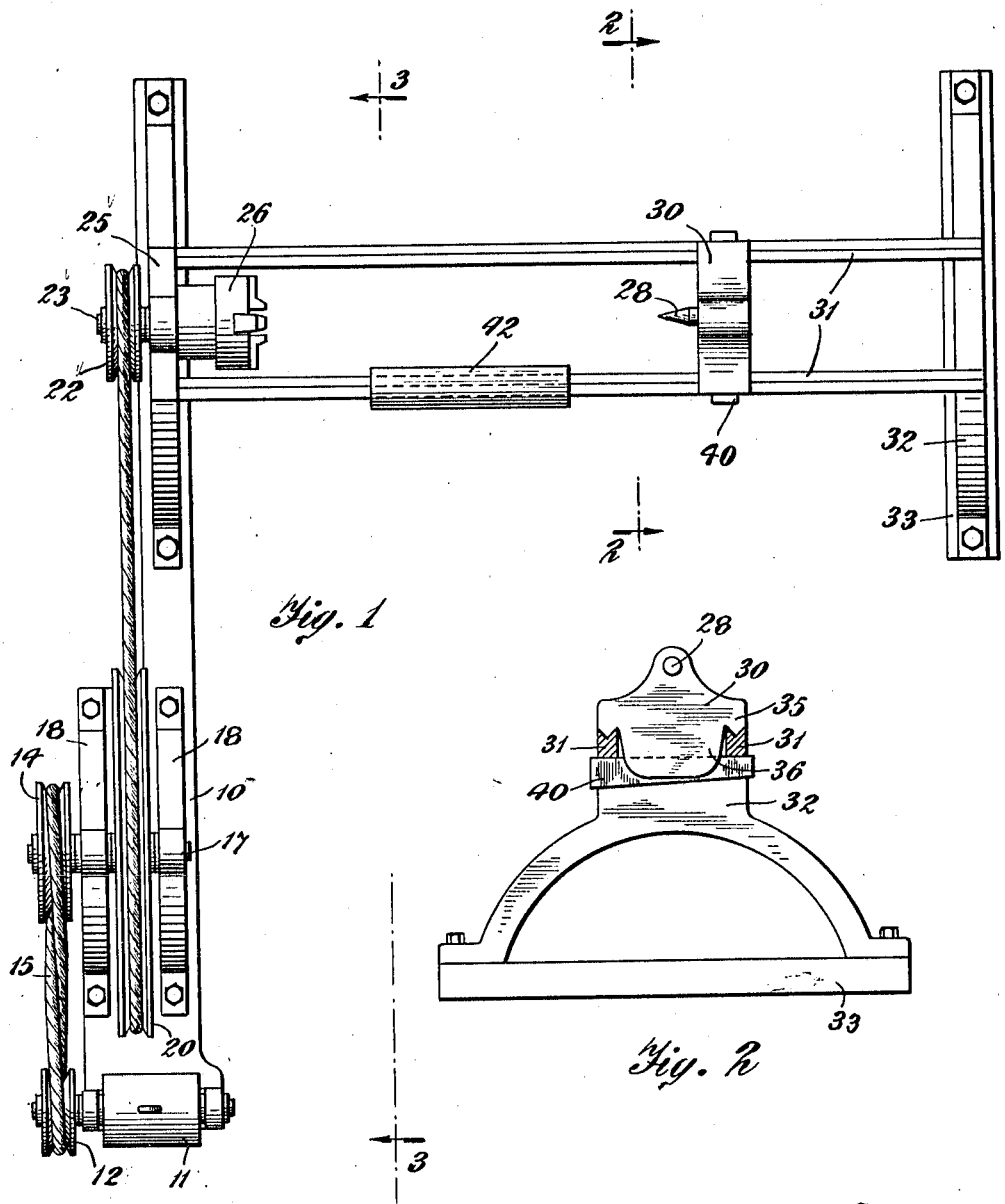

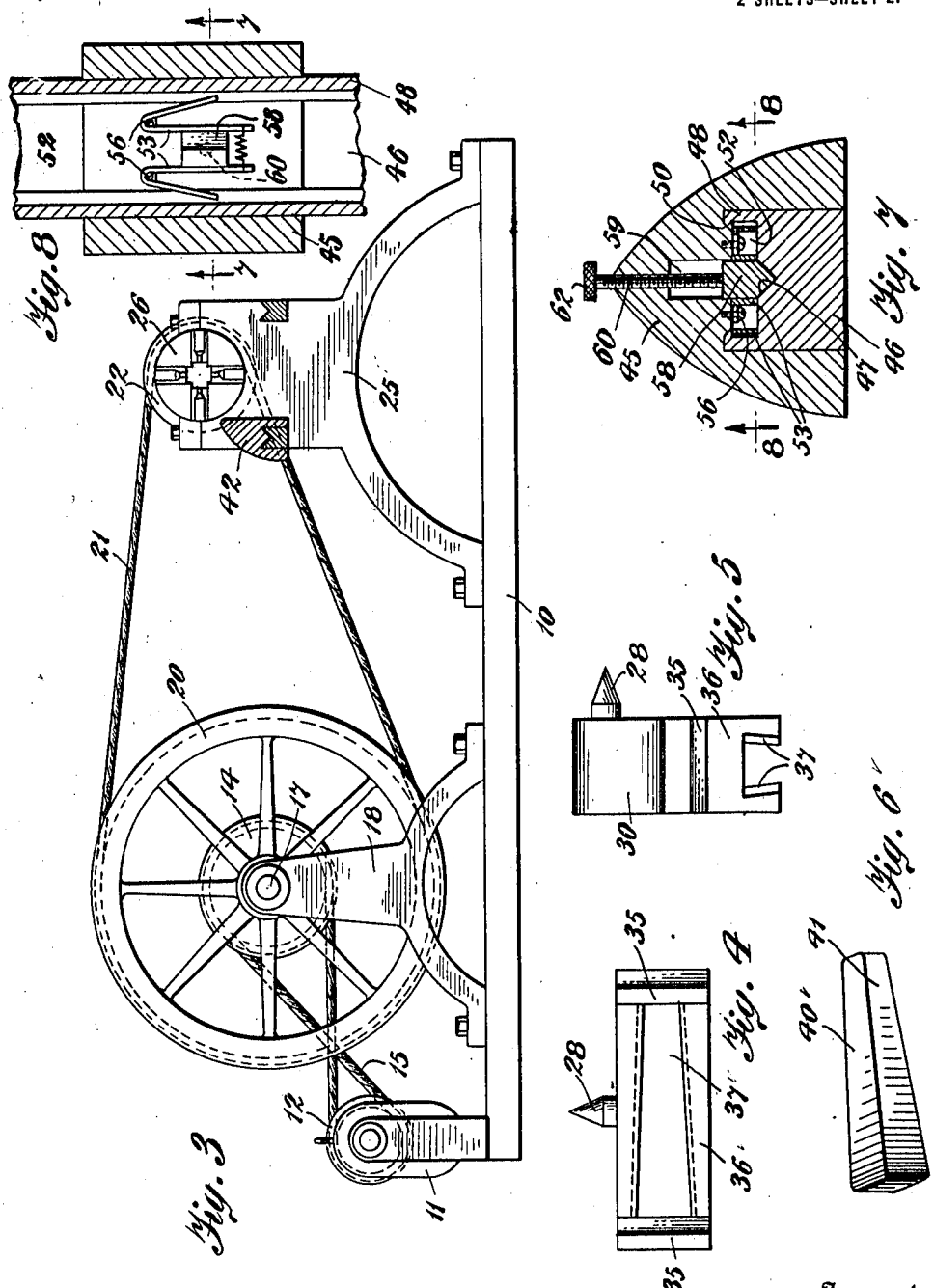

MIKE SOPCENSE, OF HILES, WISCONSIN.

WOOD-TURNING LATHE.

1,314,544.        Specification of Letters Patent.        Patented Sept. 2, 1919.

Application filed April 11, 1918, Serial No. 227,901. Renewed July 12, 1919. Serial No. 310,503.

*To all whom it may concern:*

Be it known that I, MIKE SOPCENSE, a subject of the Emperor of Austria, resident of Hiles, county of Forest, and State of Wisconsin, have invented certain new and useful Improvements in Wood-Turning Lathes, of which the following is a specification.

This invention relates to machine tools and particularly to the kind adapted to be used in turning wood. The principal objects of the invention are to provide a simple tool for the purpose which can be manufactured at a moderate expense and which is adjustable to suit the part which is to be turned.

A further object is to provide a novel device whereby the tailstock may be secured relatively to the rails or shears at any desired point and without the use of screws or like fastenings. A still further object is to provide means whereby the tool rest may be readily adjusted and secured along its support.

These and other like objects are attained by the novel construction and combination of parts hereinafter described and shown in the accompanying drawings, forming a material part of this specification, and in which:—

Figure 1 is a top plan view of a wood turning lathe made in accordance with the invention.

Fig. 2 is a transverse sectional view taken on line 2—2 of Fig. 1.

Fig. 3 is a partial side elevational and sectional view, the section being taken on line 3—3 of Fig. 1.

Fig. 4 is a bottom plan view of the tailstock.

Fig. 5 is a side elevational view of the same.

Fig. 6 is a perspective view of the locking key.

Fig. 7 is an enlarged transverse sectional view showing a modified means of tool support, the section being taken on line 7—7 of Fig. 8, and Fig. 8 is a horizontal sectional view taken on line 8—8 of Fig. 7.

The drawings indicate a platform 10, upon one end of which is secured a motor 11, having upon its shaft a pulley 12, transmitting power to another pulley 14, by means of the belt 15, the latter pulley being secured upon a counter shaft 17, journaled in a pair of brackets 18, rigidly engaged with the platform 10.

Also secured between the brackets upon the shaft 17 is a wheel 20, communicating power through the belt 21 to another pulley 22, upon the spindle 23 of the machine head, the same being rotatable in a bearing or head stock 25, also rigidly engaged with the platform 10.

Secured to the front end of the spindle 23 is a chuck or work engaging means 26, which centers and securely clamps the article to be turned at one end while its opposite end rotates upon a center 28, fixed in the headstock 30 which is slidably engaged on a pair of parallel rails or shears 31, having substantially V-shaped grooves on their upper edges and secured at one end in the head stock 25, the other end being likewise secured in another bracket 32, bolted to a support 33, in such manner that the rails are substantially level and firmly supported.

In order to hold the head-stock rigidly engaged when in an adjusted position along the rails 31, the bottom element 35 is extended laterally so as to make contact upon the top of both rails 31, longitudinally thereof, and is provided with a central lug 36 having a tapering beveled recess 37, transversely formed in the bottom of the footing, which extends downwardly between the rails 31, while a tapering wedge 40, formed with beveled sides 41, engages with the bevel formed in the recess 37 as the same is entered below the rails. The key or plug 40 makes contact with their lower surfaces while the central portion engages in the slots, drawing it firmly downward, and locking it upon the grooved upper surface of the rails. When it is desired to adjust the headstock, the key or wedge 40 is struck upon the smaller end, thereby allowing the footstock to be moved lengthwise of the rails and again secured in position by forcing the key inward.

An ordinary form of slide-rest 42 is formed with a groove in its lower side adapted to engage with the V-shaped slot in the top of the rail and may be adjusted therealong as desired.

In the form shown in Figs. 7 and 8 a modification of the tool rest is indicated by the numeral 45, and the same is shown to rest upon the upper surface of a rail 46, provided with a central V-shaped groove 47 and having extending flanged edges 48 along its upper surface provided with overhanging flanges 50, the tool rest 45 being shaped to agree with the upper surface of the rail.

Also in the rail between the side extensions 48 is a recess 52 in which are disposed a pair of bent springs 53 in such manner as to fill the recess and to be held therein by the overhanging flanges 50. Each of the springs 53 is provided with a pivot 56 by which they are held to the rest 45, so that as the same is adjusted longitudinally on the rail, the springs are carried with it.

In order to retain the tool rest in its desired location, a wedge 58, slidable within a recess 59, formed in the slide rest 45, is provided with an adjusting screw 60 having a knurled operating head 62. Thus, when it is desired to clamp the tool rest to its desired location the screw 60 is turned downward, forcing the wedge against the springs whereby they are caused to tensionally engage within the recess 52 and clamp the tool rest to the rail.

Having thus described my invention what I claim as new and desire to secure by Letters Patent, is:—

In a wood turning lathe, the combination with the front shear thereof, said shear having longitudinally formed outer recesses upon its upper, and a tool-rest movable on said shear, of a pair of opposed springs pivoted to the lower side of said tool-rest, the outer elements of said springs being engageable in the mentioned recesses, and means carried by said tool-rest for spreading said springs so as to cause them to engage within the mentioned recesses.

In testimony whereof I have affixed my signature.

MIKE SOPCENSE.

Copies of this patent may be obtained for five cents each, by addressing the "Commissioner of Patents, Washington, D. C."